No. 855,625. PATENTED JUNE 4, 1907.
C. M. FOLLETT.
STONE AND GRIT SEPARATOR FOR CLOVER HULLERS.
APPLICATION FILED OCT. 4, 1906.
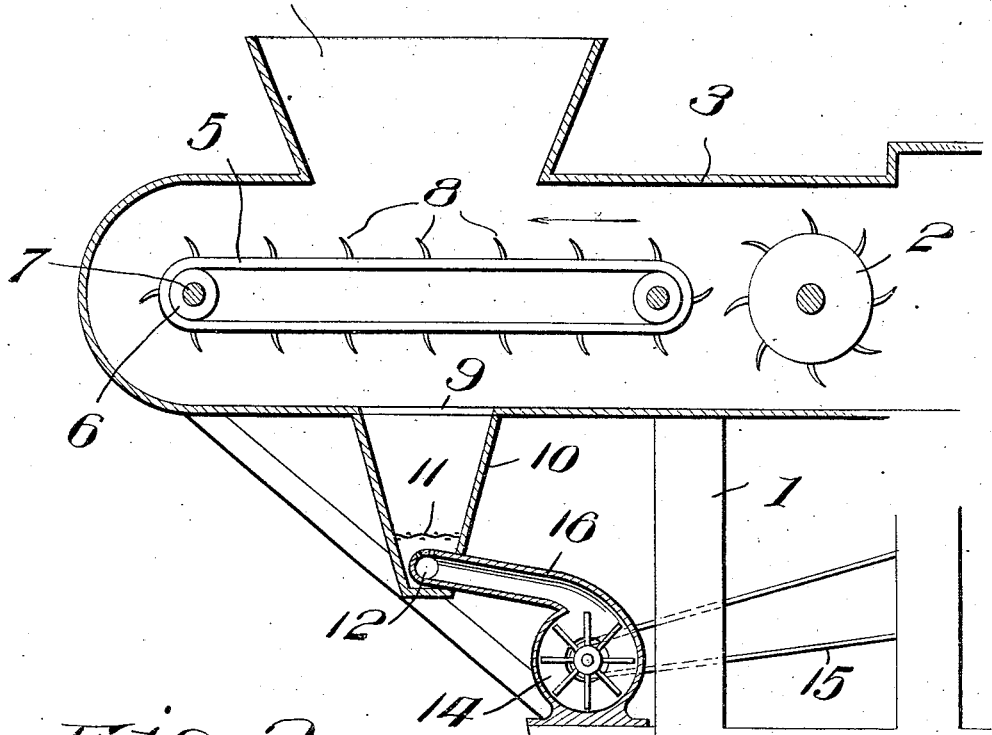
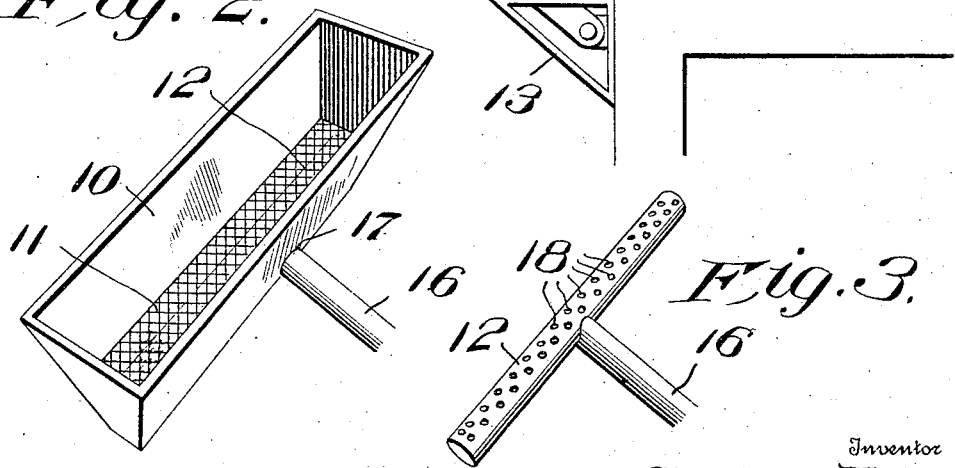
Witnesses
Inventor
Charles M. Follett
By W. I. FitzGerald & Co.,
Attorneys

UNITED STATES PATENT OFFICE.

CHARLES M. FOLLETT, OF MONTGOMERY, MICHIGAN.

STONE AND GRIT SEPARATOR FOR CLOVER-HULLERS.

No. 855,625. Specification of Letters Patent. Patented June 4, 1907.

Application filed October 4, 1906. Serial No. 337,429.

*To all whom it may concern:*

Be it known that I, CHARLES M. FOLLETT, a citizen of the United States, residing at Montgomery, in the county of Hillsdale and State of Michigan, have invented certain new and useful Improvements in Stone and Grit Separators for Clover-Hullers; and I do hereby declare the following to be a full, clear, and exact description of the invention, such as will enable others skilled in the art to which it appertains to make and use the same.

My invention relates to new and useful improvements in threshing machines, and more particularly to a feeding device for clover hullers, and my object is to provide means for ridding the clover of foreign matters such as stones, grit or the like, and a further object is to provide means for separating the particles of straw and chaff from the stones and causing the same to be fed cleaner to the cylinder, while the stones remain in a suitable receptacle provided therefor.

Other objects and advantages will be hereinafter referred to and more particularly pointed out in the claims.

In the accompanying drawings which are made a part of this application. Figure 1 is a sectional view through a feeding device with my improved attachment secured thereto, the feeder and device being mounted upon one end of the separator. Fig. 2 is a sectional view showing the receptacle removed from position upon the feeder, and Fig. 3 is a perspective view of the blast conveying pipe removed from the receptacle.

Referring to the drawing in which similar reference numerals designate corresponding parts throughout the several views, 1 indicates the frame of the front end of a separator and 2 a cylinder mounted therein, the said frame and cylinder being constructed in the usual or any preferred manner.

Disposed on the front part of the frame and in communication with the cylinder is a feeding device consisting of a chamber 3, having a hopper 4 on its upper surface, through which clover or like products are disposed into the chamber, the clover being engaged by an endless belt 5 disposed horizontally in the chamber 3 and directly around suitable rollers 6, said rollers in turn being disposed upon shafts 7, which are driven from any suitable point upon the separator.

The belt 5 is provided on its outer surface with a plurality of teeth 8, which are adapted to engage the straw disposed through the hopper 4, and deliver the same to the cylinder 2, where the seed is extracted from the clover. The belt 5 is caused to travel in the direction indicated by the arrow in Fig. 1, or toward the front of the chamber 3, thereby disposing the straw over the floor of the chamber 3, and directing the same over an opening 9 below which is disposed a trough-like receptacle 10, near the bottom of which is disposed a screen 11, between which and the bottom of the receptacle is disposed a tubular nozzle 12, the opening 9, receptacle 10, screen 11 and tubular nozzle 12 extending the full width of the chamber 3.

Mounted upon a suitable bracket 13 and secured to the front end of the frame 1 is a blast fan 14, said fan being of the usual or any preferred construction, and is driven by a belt 15 from any suitable point upon the separator. The fan 14 is disposed in communication with the nozzle 12 through the medium of a blast pipe 16, said pipe extending from the blast fan through an opening 17 in the receptacle 10, and into communication with the tubular nozzle 12 at its central portion, the nozzle 12 being provided with a plurality of bores 18, through which the blast from the fan escapes into the trough-like receptacle 10.

It will be seen by this construction that when the straw is being conveyed over the opening 9, the blast of air will be directed into the straw thereby agitating the same, so that any impurities such as gravel, grit or the like will be separated therefrom, and descend into the receptacle 10 and rest upon the screen 11, thereby purifying the straw before it is engaged by the cylinder 2. It will also be seen that the blast from the fan will prevent any of the particles of straw or chaff from descending into the trough-like receptacle 10, which would tend to choke the same, and by providing the blast fan and disposing the same below the feeding mechanism, it will be seen that the straw will be more or less purified by the dust being extracted therefrom and blown out through the hopper 4.

What I claim is:

1. In a device of the class described the combination with a suitable feeding mechanism having an opening therein, and means to direct the straw over said opening; of a receptacle below said opening, a screen in said receptacle adapted to receive impurities from the straw, a tubular nozzle having a plurality of bores therein disposed in said receptacle and below the screen and means to direct air through said nozzle whereby the straw passing over said opening will be agitated and the chaff and particles of straw removed from the receptacle.

2. In a device of the class described, a receptacle having a screen therein, a tubular nozzle longitudinally disposed in said receptacle and below said screen, said nozzle having a plurality of bores therein, a fan, a pipe connecting said fan and nozzle, means to operate said fan whereby a blast of air will be directed through said nozzle and receptacle and means to dispose straw or the like above said receptacle whereby the straw will be agitated and impurities removed therefrom.

In testimony whereof I have signed my name to this specification in the presence of two subscribing witnesses.

CHARLES M. FOLLETT.

Witnesses:
R. M. CAIRNS,
ELMER E. BOVEE.